(12) United States Patent
Yang et al.

(10) Patent No.: US 10,477,060 B2
(45) Date of Patent: Nov. 12, 2019

(54) SCANNING DEVICE, IMAGE-FORMING APPARATUS, AND SCANNING METHOD

(71) Applicant: ZHUHAI PANTUM ELECTRONICS CO., LTD., Zhuhai (CN)

(72) Inventors: Jianghua Yang, Zhuhai (CN); Jun Zhang, Zhuhai (CN)

(73) Assignee: ZHUHAI PANTUM ELECTRONICS CO., LTD., Zhuhai (CN)

(*) Notice: Subject to any disclaimer, the term of this patent is extended or adjusted under 35 U.S.C. 154(b) by 0 days.

(21) Appl. No.: 16/276,989

(22) Filed: Feb. 15, 2019

(65) Prior Publication Data
US 2019/0182403 A1    Jun. 13, 2019

Related U.S. Application Data

(63) Continuation of application No. PCT/CN2017/093524, filed on Jul. 19, 2017.

(30) Foreign Application Priority Data

Aug. 26, 2016 (CN) .......................... 2016 1 0736117

(51) Int. Cl.
*H04N 1/203* (2006.01)
*H04N 1/00* (2006.01)
(Continued)

(52) U.S. Cl.
CPC ....... *H04N 1/2032* (2013.01); *H04N 1/00976* (2013.01); *H04N 1/233* (2013.01)

(58) Field of Classification Search
USPC ................................. 350/1.1–3.29
See application file for complete search history.

(56) References Cited

U.S. PATENT DOCUMENTS 5,280,545 A    1/1994  Masuda
5,689,347 A   11/1997  Naoi
(Continued)

FOREIGN PATENT DOCUMENTS

CN    1395217 A    2/2003
CN    1614985 A    5/2005
(Continued)

OTHER PUBLICATIONS

The World Intellectual Property Organization (WIPO) International Search Report for PCT/CN2017/093524 dated Sep. 30, 2017 4 Pages.

*Primary Examiner* — Marcellus J Augustin
(74) *Attorney, Agent, or Firm* — Anova Law Group PLLC (57) ABSTRACT

The present disclosure provides a scanning device, an image-forming apparatus, and a scanning method. In one aspect, the scanning device provided by the present disclosure includes a first sensor, a second sensor, a first channel corresponding to the first sensor, a second channel corresponding to the second sensor, and a selector. The first sensor is configured to collect first image data of a to-be-scanned document. The second sensor is configured to collect second image data of the to-be-scanned document. The selector is configured to acquire image data alternately from the first channel and the second channel to acquire a pixel of the first image data from the first channel and a pixel of the second image data from the second channel by using a pixel-by-pixel acquisition mode for each of the first and second channels in one acquisition cycle.

13 Claims, 7 Drawing Sheets

(51) Int. Cl.
*H04N 1/23* (2006.01)
*G05B 1/00* (2006.01)

(56) References Cited

U.S. PATENT DOCUMENTS

| | | | | |
|---|---|---|---|---|
| 6,160,578 A | * | 12/2000 | Carroll | H04N 5/3595 |
| | | | | 348/222.1 |
| 7,995,250 B2 | * | 8/2011 | Kato | H04N 1/46 |
| | | | | 250/208.1 |
| 2006/0072843 A1 | * | 4/2006 | Johnston | G06K 9/20 |
| | | | | 382/254 |
| 2007/0018074 A1 | * | 1/2007 | Kinoshita | H04N 9/045 |
| | | | | 250/208.1 |
| 2010/0123939 A1 | | 5/2010 | Tsai | |
| 2011/0194155 A1 | | 8/2011 | Kasuga | |
| 2014/0104464 A1 | * | 4/2014 | Spears | H04N 9/04 |
| | | | | 348/272 |
| 2015/0288843 A1 | | 10/2015 | Ishida | |

FOREIGN PATENT DOCUMENTS

| | | | |
|---|---|---|---|
| CN | 1791173 A | 6/2006 | |
| CN | 1816093 A | 8/2006 | |
| CN | 100397860 C | 6/2008 | |
| CN | 100496081 C | 6/2009 | |
| CN | 106357949 A | 1/2017 | |
| JP | H02234273 A | 9/1990 | |

\* cited by examiner

SCANNING DEVICE, IMAGE-FORMING APPARATUS, AND SCANNING METHOD

CROSS-REFERENCE TO RELATED APPLICATION

This application is a continuation application of International Application No. PCT/CN2017/093524, filed on Jul. 19, 2017, which claims priority to Chinese Patent Application No. 201610736117.5, filed on Aug. 26, 2016, the entire contents of which are incorporated in the present application by reference.

TECHNICAL FIELD

The present disclosure relates to the field of image processing technologies, and in particular, to a scanning device, an image-forming apparatus, and a scanning method.

BACKGROUND

A scanning device having a double-sided scanning function is often used to increase the efficiency of reading a document and to improve quietness, etc.

Figure 1:
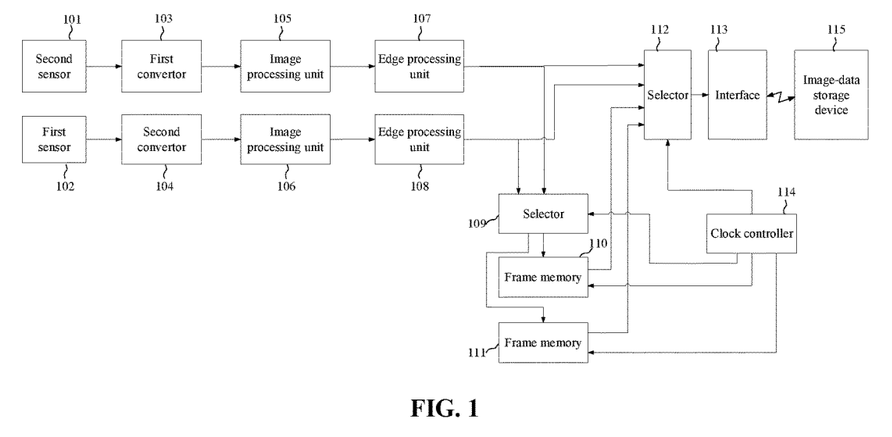
FIG. 1 is a schematic structural diagram of a scanning device for double-sided scanning in the existing technology.

FIG. 1 is a schematic structural diagram of a scanning device used for double-sided scanning in the existing technology. As shown in FIG. 1, in order to support double-sided scanning of a to-be-scanned document, a scanning device of the existing technology needs to separately configure a corresponding set of hardware modules for each side of the to-be-scanned document. Each set of hardware modules includes a sensor, a convertor, an image processing unit, a boundary processing unit, a frame memory, a selector, an interface. Therefore, in the existing technology, the hardware cost is relatively high when implementing double-sided scanning.

SUMMARY

In view of this, the present disclosure provides a scanning device, an image-forming apparatus, and a scanning method for solving the problems of high hardware cost of the scanning device for realizing double-sided scanning in the existing technology.

In one aspect, the present disclosure provides a scanning device including a first sensor, a second sensor, a first channel corresponding to the first sensor, a second channel corresponding to the second sensor, and a selector.

The first sensor is configured to collect first image data of a to-be-scanned document.

The second sensor is configured to collect second image data of the to-be-scanned document.

The selector is configured to acquire image data alternately from the first channel and the second channel to acquire a pixel of the first image data from the first channel and a pixel of the second image data from the second channel in a pixel-by-pixel acquisition mode for each of the first and second channels in one acquisition cycle.

In some embodiments, the scanning device further includes a data remapping unit.

The data remapping unit is configured to remap the image data acquired by the first sensor and the second sensor according to an acquisition sequence of the selector, to acquire a first image-data series and a second-image-data series; and the first image-data series includes the first image data arranged in the acquisition order of the selector, and the second image-data series includes the second image data arranged in the acquisition order of the selector.

In some embodiments, the scanning device further includes a first converter configured between the selector and the data remapping unit.

The first converter is configured to perform an analog-to-digital conversion on image data acquired by the selector.

The first converter is further configured to send the image data acquired by the analog-to-digital conversion to the data remapping unit according to the acquisition sequence of the selector.

In some embodiments, scanning device further includes a second converter configured between the first sensor and the first channel, and a third converter configured between the second sensor and the second channel.

The second converter is configured to perform the analog-to-digital conversion on the first image data collected by the first sensor.

The third converter is configured to perform the analog-to-digital conversion on the second image data collected by the second sensor.

In some embodiments, scanning device further includes a data filtering unit.

In some embodiments, the data filtering unit can be configured to determine a first time point and a second time point, delete one or more pixels of the first image data in the first image-data series collected by the first sensor after the first time point, and delete one or more pixels of the second image data in the second image-data series collected by the second sensor before the second time point; or In some embodiments, the data filtering unit can be configured to delete one or more pixels of the first image data at an end of the first image-data series according to a first specified value and delete one or more pixels of the second image data at a start of the second image-data series according to a second specified value.

In some embodiments,

A selection frequency when the selector selects a channel is greater than or equal to twice of an output frequency of the first sensor; and/or the selection frequency when the selector selects the channel is greater than or equal to twice of an output frequency of the second sensor.

In some embodiments, the first image data may be front-side image data of the to-be-scanned document, and the second image data may be back-side image data of the to-be-scanned document.

In some embodiments, the first image data and the second image data may be both the front-side image data of the to-be-scanned document.

In some other embodiments, the first image data and the second image data may be both back-side image data of the to-be-scanned document.

One of the above technical solutions has the following beneficial effects.

The scanning device provided by the present disclosure acquires images by scanning the document simultaneously by two sensors, and processes the images collected by the two sensors through a selector, thereby saving hardware costs and solving the problems of high hardware costs of the scanning device to realize double-sided scanning device in the existing technology. Moreover, the working mode that the selector uses a pixel-by-pixel acquisition mode for each of the first and second channels to acquire the image data alternately from the first channel and the second channel, so that the scanning speed of the scanning device when performing double-sided scanning is approximately equal to that of single-sided scanning, improving scanning efficiency.

In another aspect, the present disclosure further provides an image-forming apparatus, characterized in that the apparatus includes the foregoing scanning device and an image-forming device; and the image-forming device is configured to form an image on the image-forming medium according to the image data processed by the scanning device.

One of the above technical solutions has the following beneficial effects.

The image-forming apparatus provided by the present disclosure acquires images by scanning the document simultaneously by two sensors, and processes the images collected by the two sensors through a selector, thereby saving hardware costs and solving the problems of high hardware costs of the scanning device to realize double-sided scanning device. Moreover, the working mode that the selector uses a pixel-by-pixel acquisition mode for each of the first and second channels to acquire the image data alternately from the first channel and the second channel, so that the scanning speed of the scanning device when performing double-sided scanning is approximately equal to that of single-sided scanning, improving scanning efficiency.

In another aspect, the application further provides a scanning method, and the method includes a first sensor collecting first image data of the to-be-scanned document; a second sensor collecting second image data of the to-be-scanned document; and a selector acquiring image data alternately from the first channel and the second channel to acquire a pixel of the first image data from the first channel and a pixel of the second image data from the second channel by using a pixel-by-pixel acquisition mode for each of the first and second channels in one acquisition cycle.

In some embodiments, the method further includes the data remapping unit remapping the acquired image data according to an acquisition sequence of the selector, to acquire a first image-data series and a second image-data series, where the first image-data series includes the first image data arranged in the acquisition sequence of the selector, and the second image-data series includes the second image data arranged in the acquisition sequence of the selector.

In some embodiments, before the data remapping unit remaps the acquired image data according to the acquisition order of the selector, the method further include the first converter performing an analog-to-digital conversion on the image data acquired from the first sensor and the second sensor, and sending image data acquired by the analog-to-digital conversion to the data remapping unit according to an acquisition sequence of the selector.

In some embodiments, the selector uses a pixel-by-pixel acquisition mode for each of the first and second channels to acquire image data alternately from the first channel and the second channel. The method also includes the second converter performing the analog-to-digital conversion on the first image data collected by the first sensor; and the third converter performing the analog-to-digital conversion on the second image data collected by the second sensor.

In some embodiments, the data remapping unit remaps the acquired image data according to the acquisition sequence of the selector to acquire the first image-data series and the second image-data series, the method further includes the data filtering unit determining a first time point and a second time point; and the data filtering unit deleting one or more pixels of the first image data in the first image-data series collected by the first sensor after the first time point, and deleting one or more pixels of the second image data in the second image-data series collected by the second sensor before the second time point; or the data filtering unit deleting one or more pixels of the first image data at an end of the first image-data series according to a first specified value, and deleting one or more pixels of the second image data at a start of the second image-data series according to a second specified value.

In some embodiments, the selection frequency when the selector selects a channel is greater than or equal to twice an output frequency of the first sensor; and/or, the selection frequency when the selector selects the channel is greater than or equal to twice an output frequency of the second sensor.

In some embodiments, the first image data is front-side image data of a to-be-scanned document, and the second image data is back-side image data of the to-be-scanned document; the first image data and the second image data are both the front-side image data of the to-be-scanned document; or the first image data and the second image data are both back-side image data of the to-be-scanned document.

One of the above technical solutions has the following beneficial effects.

The scanning method provided by the present disclosure, acquires images by scanning the document simultaneously by two sensors, and processes the images collected by the two sensors through a selector, thereby saving hardware costs and solving the problems of high hardware costs of the scanning device to realize double-sided scanning device. Moreover, the working mode that the selector uses a pixel-by-pixel acquisition mode for each of the first and second channels to acquire the image data alternately from the first channel and the second channel, so that the scanning speed of the scanning device when performing double-sided scanning is approximately equal to that of single-sided scanning, improving scanning efficiency.

DESCRIPTION OF THE DRAWINGS

In order to more clearly illustrate the technical solutions of the present disclosure, the drawings to be used in the embodiments will be briefly described below. It is obvious that the drawings in the following description are only some embodiments of the present disclosure. A person of ordinary skills in the art, other drawings can be acquired from these drawings without any creative work.

DETAILED DESCRIPTION

In order to better understand the technical solutions of the present disclosure, the present disclosure will be described in detail below with reference to the accompanying drawings.

It should be understood that the described embodiments are only a part of the embodiments of the present disclosure, and not all of the embodiments. All other embodiments acquired by a person of ordinary skill in the art based on the embodiments of the present disclosure without departing from the inventive scope are the scope of the present disclosure.

The terms used in the present disclosure are for the purpose of describing particular embodiments only and are not intended to limit the application. The singular forms "a", "said" and "the" used in the present disclosure and the appended claims are also intended to include a plurality of forms unless the context clearly indicates otherwise.

It should be understood that the term "and/or" as used herein is merely describing relationships of contextual objects, indicating that there may be three relationships, for example, A and/or B, which may indicate that A only, A and B, and B only. In addition, the character "/" in this present disclosure generally indicates that the contextual object is an "or" relationship.

It should be understood that although the terms first, second, etc. may be used in this application to describe sensors, etc., these sensors and the like should not be limited to these terms. These terms are only used to distinguish sensors and the like from each other. For example, the first sensor may also be referred to as a second sensor without departing from the scope of the present disclosure. Similarly, the second sensor may also be referred to as a first sensor.

Depending on the context, the word "if" as used herein may be interpreted as "when" or "if" or "in response to determining" or "in response to detecting." Similarly, depending on the context, the phrase "if determined" or "if detected (conditions or events stated)" can be interpreted as "when determined" or "in response to determination" or "when detected (stated condition or event)" or "in response to a test (condition or event stated)".

Figure 2A:
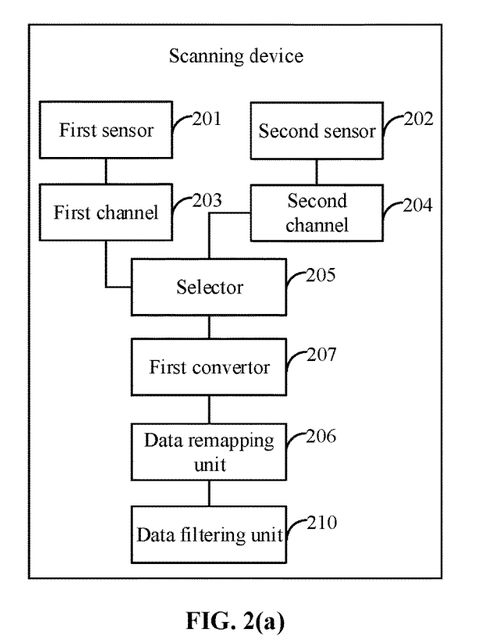
FIG. 2(a) is a schematic structural diagram of an exemplary scanning device according to some embodiments of the present disclosure.
Figure 2B:
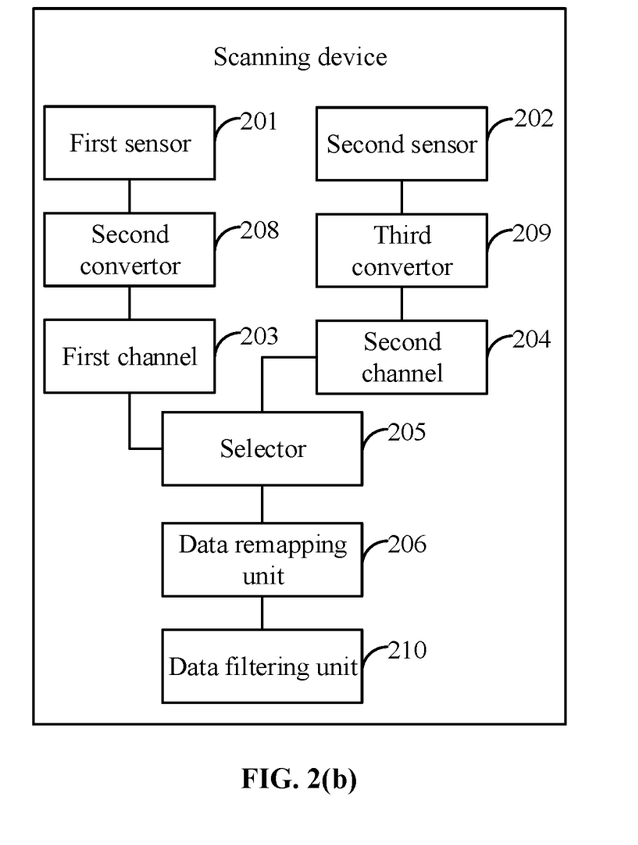
FIG. 2(b) is a schematic structural diagram of another exemplary scanning device according to some other embodiments the present disclosure.

One aspect of the present disclosure provides a scanning device. FIG. 2(a) is a schematic structural diagram of an exemplary scanning device according to some embodiments of the present disclosure. FIG. 2(b) is a schematic structural diagram of an exemplary scanning device according to some embodiments of the present disclosure.

As shown in FIG. 2(a) or as shown in FIG. 2(b), the scanning device includes a first sensor 201, a second sensor 202, a first channel 203 corresponding to the first sensor 201, and a second channel 204 corresponding to the second sensor 202, and selector 205. The first sensor 201 is configured to collect first image data of a to-be-scanned document. The second sensor 202 is configured to collect second image data of the to-be-scanned document. The selector 205 is configured to acquire image data alternately from the first channel 203. The second channel 204 to acquire a pixel of the first image data from the first channel 203 and a pixel of the second image data from the second channel 204 by using a pixel-by-pixel acquisition mode for each of the first and second channels in one acquisition cycle.

In some embodiments of the present disclosure, the to-be-scanned document may include, but is not limited to, at least one of a document, a credential, an image, or a photo, which is not limited in the present disclosure.

As shown in FIG. 2(a) or FIG. 2(b), the scanning device provided by the present disclosure may include, but is not limited to, two channels including the first channel 203 and the second channel 204. The two channels may be arbitrarily selected by the selector 205 from at least two channels in the scanning device as the first channel 203 and the second channel 204, to acquire the first image data through the first channel 203 and acquire the second image data through the second channel 204. This application does not limit this.

In some embodiments of the present disclosure, as shown in FIG. 2(a) or as shown in FIG. 2(b), the selector 205 uses a pixel-by-pixel acquisition mode, also referred as to an acquisition mode as a pixel by a pixel, to acquire the image data alternately from the first channel 203 and the second channel 204. The pixel of the first image data is acquired through the first channel 203 and the pixel of the second image is acquired through the second channel 204 in one acquisition cycle. For example, the pixel of the first image data may be a first image-data pixel and the pixel of the second image data may be a second image-data pixel.

In the present disclosure, the selector 205 uses the pixel-by-pixel acquisition mode for each of the first and second channels to acquire image data alternately from the first channel and the second channel, that is, the selector 205 can utilize the time interval of the first sensor 201 outputting two first image-data pixels to acquire the pixel of the second image data output by the second sensor 202, and similarly, also can utilize the time interval of the second sensor 202 outputting two second image-data pixels, to acquire the pixel of the first image data output by the first sensor 201, thereby improving the efficiency of the selector to acquire pixel points of image data.

In some embodiments of the present disclosure, as shown in FIG. 2(a) or as shown in FIG. 2(b), the selection frequency when the selector 205 selects a channel is greater than or equal to twice the output frequency of the first sensor 201; and/or, the selection frequency when the selector 205 selects the channel is greater than or equal to twice the output frequency of the second sensor 202.

In an exemplary implementation process, as shown in FIG. 2(a) or as shown in FIG. 2(b), when the output frequency of the first sensor 201 is the same as the output frequency of the second sensor 202, the selection frequency when the selector 205 selects the channel is greater than or equal to twice the output frequency of the first sensor 201. Therefore, in the case where the data lengths processed by the first sensor 201, the second sensor 202, and the selector 205 are the same, the output frequency of the data output by the first sensor 201 and the second sensor 202 is f1; and the selection frequency when the selector 205 selects the channel is greater than twice the output frequency when the first sensor 201 outputs data, that is, the selection frequency when the selector 205 selects the channel is greater than 2×f1.

Further, as shown in FIG. 2(a) or as shown in FIG. 2(b), if the number of bits when the first sensor 201 outputs data is n1, the number of bits when the selector 205 acquires data is n2, the selection frequency when the selector 205 in the image acquisition unit selects the channel is greater than or equal to 2×n2/n1 times the output frequency of the first sensor 201. That is, even if n1>n2, the selection frequency of the selector 205 is very fast, the data of the first sensor 201 and the data of the second sensor 202 can be simultaneously acquired, and the selector 205 in one cycle can select the data of first sensor 201 and the second sensor 202 in n2/n1 cycle. In this way, the data length that the selector 205 can collect in one acquisition cycle is smaller than the data length output by the sensor, thereby ensuring that the selector 205 can acquire the image data collected by the first sensor 201 and the image data collected by the second sensor 202 in an uninterrupted, continuous, and cross-flow manner.

Therefore, in the above technical solution provided by the embodiment, the scanning speed of the double-sided scanning of the to-be-scanned document is the same as the scanning speed of the single-sided scanning, which greatly saves the scanning time and improves the scanning efficiency.

Figure 3:
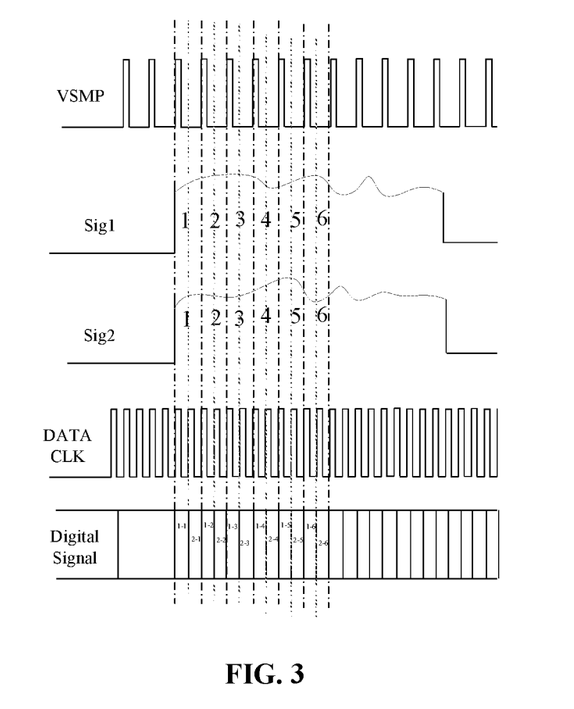
FIG. 3 is a schematic diagram of a signal frequency of a scanning device according to some embodiments of the present disclosure.

FIG. 3 is a schematic diagram of a signal frequency of a scanning device according to some embodiments of the present disclosure. As shown in FIG. 3, the VSMP (video sample timing pulse) represents a clock control signal, and the first sensor 201 collects the first image data after receiving the clock control signal, and the second sensor 202 collects the second image data after receiving the clock control signal. The signal transmitted by the first sensor 201 is Sig1, the signal transmitted by the second sensor 202 is Sig2, and 1, 2, 3, 4, 5, and 6 in the Sig1 signal line and the Sig2 signal line represent image-data pixels. DATA CLK is a selection signal when the selector 205 selects the first channel 203 or selects the second channel 204 to acquire image data. In FIG. 3, two vertical dashed lines indicate different channels, and the data signal is the image-data signal acquired by the selector 205. For example, the 1 and 2 in front of the dash line of 1-2, 1-3, 1-4, 1-5, 1-6, 2-1, 2-2, 2-3, 2-4, and 2-5 in the data signal line respectively represent the channel selected when acquiring data. The 1, 2, 3, 4, 5, and 6 behind the dash line respectively represent different image-data pixels in each channel.

As shown in FIG. 3, the VSMP signal is loose, i.e., the output frequencies of the first sensor 201 and the second sensor 202 are low, assuming it is f1. The DATA CLK signal is dense, indicating that in a selection cycle the frequency of the selector 205 selecting the first channel 203 or selecting the second channel 204 is relatively frequent, that is, the selection frequency of the selector 205 is high, assuming that the selection frequency of the selector 205 is f2. In an exemplary implementation process, in order to implement the pixel-by-pixel acquisition mode for each of the first and second channels by the selector 205, the image data is acquired alternately from the first channel 203 and the second channel 204, and the selection frequency f2 of the DATA CLK signal may be twice or more of the signal frequency f1 of the VSMP signal, that is, the selection frequency f2 when the selector 205 selects a channel needs to be greater than or equal to 2f1.

In an exemplary implementation process, after receiving the control signal sent by the sensor control unit, the first sensor acquires first image data of the color indicated by the control signal, and after receiving the control signal sent by the sensor control unit, accordingly the second sensor acquires the second image data of the color indicated by the control signal.

In the present disclosure, the control signals received by the first sensor and the second sensor may include, but are not limited to, at least one of a clock control signal or a lighting control signal.

In some embodiments, the first sensor may acquire the first image data at a specified time point according to the received clock control signal, or acquire the first image data immediately after receiving the clock control signal. And the second sensor may acquire the second image data at a specified time point according to the received clock control signal, or acquire the second image data immediately after receiving the clock control signal.

In some embodiments, the first sensor may collect the first image data of the color indicated by the lighting control signal according to the received lighting control signal, and the second sensor may collect the second image data of the color indicated by the lighting control signal according to the received lighting control signal.

In some embodiments, the control signals sent by the sensor control unit to the first sensor and the second sensor may be the same and may be different, which is not limited in the present disclosure.

Figure 4:
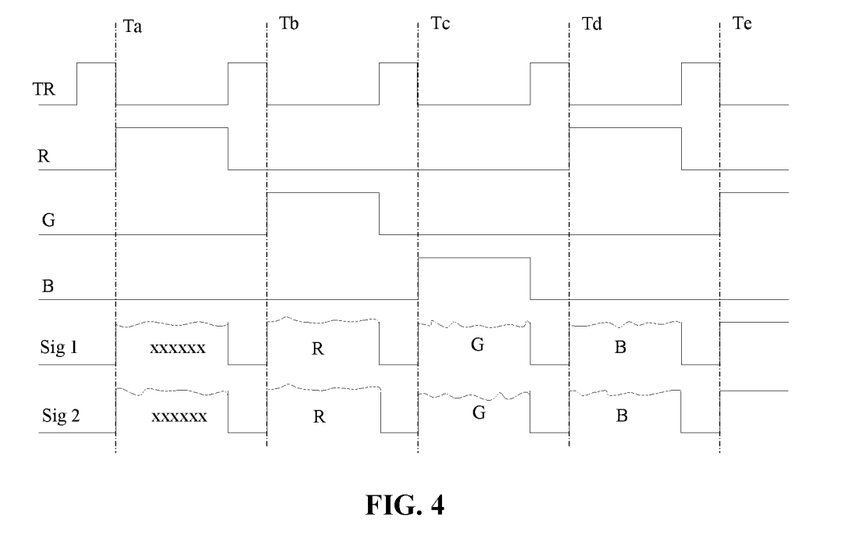
FIG. 4 is a schematic diagram of control signals according to some embodiments of the present disclosure.

In some embodiments, FIG. 4 is a schematic diagram of control signals according to some embodiments of the present disclosure. As shown in FIG. 4, TR is a clock control signal sent by the sensor control unit to the first sensor 201 and the second sensor 202, and Sig1 is a signal diagram of the pixel of the first image data acquired by the selector 205 through the first channel 203, and Sig2 is a signal diagram of the pixel of the second image data acquired by the selector 205 through the second channel 204, where R represents a red image data signal when the red light is turned on, G represents a green image data signal when the green light is turned on, and B represents a blue image data signal when the blue light is turned on.

In some embodiments, after receiving the control signal, the first sensor and the second sensor acquire image data of a color indicated by the control signal, the selector acquiring the image data through the first channel and the second channel is one cycle later after the lighting control signal is sent out.

In some embodiments, as shown in FIG. 4, when the sensor control unit transmits the clock control signal and the lighting control signal of the red light at the time point Ta, the R signal changes from the low level to the high level when the TR is at the time point Ta, and the red light is turned on. At this time, the first sensor collects the first image data of red color according to the received clock control signal and the lighting control signal of the red light, and the second sensor collects the second image data of red color according to the received clock control signal and the lighting control signal of the red light. The Sig1 signal is represented as R at the time point Tb, that is, the selector acquires a pixel of the first image data of red color through the first channel at the time point Tb, and the Sig2 signal is represented as R at the time point Tb, that is the selector acquires a pixel of the second image data of red color through the second channel at the time point Tb.

Similarly, as shown in FIG. 4, when the sensor control unit transmits the clock control signal and the lighting control signal of the green light at the time point Tb, the G signal changes from the low level to the high level when the TR is at the time point Tb, and the green light is turned on.

At this time, the first sensor collects the first image data of green color according to the received clock control signal and the lighting control signal of the green light, and the second sensor collects the second image data of green color according to the received clock control signal and the lighting control signal of the green light. The Sig1 signal is represented as G at the time point Tc, that is, the selector acquires a pixel of the first image data of green color through the first channel at the time point Tc, and the Sig2 signal is represented as G at the time point Tc, that is the selector acquires a pixel of the second image data of green color through the second channel at the time point Tc.

Similarly, as shown in FIG. 4, when the sensor control unit transmits the clock control signal and the lighting control signal of the blue light at the time point Tc, the B signal changes from the low level to the high level when the TR is at the time point Tc, and the blue light is turned on. At this time, the first sensor collects the first image data of blue color according to the received clock control signal and the lighting control signal of the blue light, and the second sensor collects the second image data of blue color according to the received clock control signal and the lighting control signal of the blue light. The Sig1 signal is represented as B at the time point Td, that is, the selector acquires a pixel of the first image data of blue color through the first channel at the time point Td, and the Sig2 signal is represented as B at the time point Td, that is the selector acquires a pixel of the second image data of blue color through the second channel at the time point Td.

Based on this, the selector uses the pixel-by-pixel acquisition mode for each of the first and second channels, and the image data acquired alternately from the first channel and the second channel is the intersection data of the first image data collected by the first sensor and the second image data collected by the second sensor.

Figure 5:
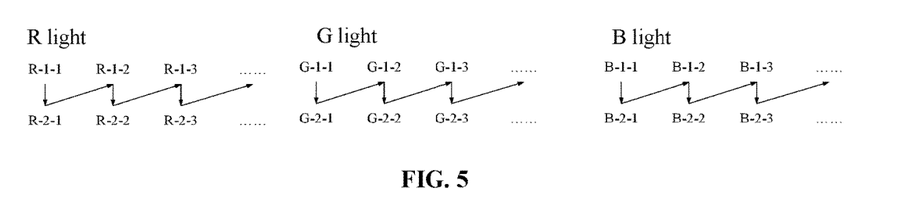
FIG. 5 is a schematic diagram of a selector acquiring image data according to some embodiments of the present disclosure.

For example, FIG. 5 is a schematic diagram of a selector acquiring image data according to some embodiments of the present disclosure.

In some embodiments of the present disclosure, the image-data pixel point may be represented by the "X-Y-Z" form, where X represents the light is turned on, Y represents the channel, and Z represents the image-data pixel. For example, X can be R, G, and B, where R represents the red light, G represents the green light, B represents the blue light. As shown in FIG. 5, R-1-1, R-1-2, and R-1-3 are the first image-data pixels collected by the first sensor, where R-1-2 represents when the red light is turned on, the first channel, and the second image-data pixel. B-2-1, B-2-2, and B-2-3 are the second image-data pixels collected by the second sensor, where B-2-3 represents when the blue light is turned on, the second channel, and 3 in the 2-3 represents the third image-data pixel of blue color collected by the second sensor.

As shown in FIG. 5, when the red light is on, the selector uses the pixel-by-pixel acquisition mode for each of the first and second channels to acquire image data alternately from the first channel and the second channel, after acquiring the first image-data pixel R-1-1 through the first channel, acquires a second image-data pixel R-2-1 through the second channel, and then acquires the image data alternately through the first channel and the second channel. Further, the selector uses the pixel-by-pixel acquisition mode for each of the first and second channels, to acquire the image data R-1-1, R-2-1, R-1-2, R-2-2, R-1-3, and R-2-3 alternately through the first channel and the second channel. The image data is the is intersection data of the first image data collected by the first sensor and the second image data collected by the second sensor.

Similarly, as shown in FIG. 5, when the green light is on, the selector uses the pixel-by-pixel acquisition mode for each of the first and second channels to acquire image data alternately from the first channel and the second channel, after acquiring the first image-data pixel G-1-1 through the first channel, acquires a second image-data pixel G-2-1 through the second channel, and then acquires the image data alternately through the first channel and the second channel. Further, the selector uses the pixel-by-pixel acquisition mode for each of the first and second channels, to acquire the image data G-1-1, G-2-1, G-1-2, G-2-2, G-1-3, and G-2-3 alternately through the first channel and the second channel. The image data is the is intersection data of the first image data collected by the first sensor and the second image data collected by the second sensor.

Similarly, as shown in FIG. 5, when the blue light is on, the selector uses the pixel-by-pixel acquisition mode for each of the first and second channels to acquire image data alternately from the first channel and the second channel, after acquiring the first image-data pixel B-1-1 through the first channel, acquires a second image-data pixel B-2-1 through the second channel, and then acquires the image data alternately through the first channel and the second channel. Further, the selector uses the pixel-by-pixel acquisition mode for each of the first and second channels, to acquire the image data B-1-1, B-2-1, B-1-2, B-2-2, B-1-3, and B-2-3 alternately through the first channel and the second channel. The image data is intersection data of the first image data collected by the first sensor and the second image data collected by the second sensor.

In some embodiments of the present disclosure, as shown in FIG. 2(a) or as shown in FIG. 2(b), the scanning device further includes a data remapping unit 206. The data remapping unit 206 can be not only configured as belonging to a portion of the scanning device, but also can be configured as belonging to a portion of a computer connected to the scanning device.

As shown in FIG. 2(a) or FIG. 2(b), the data remapping unit 206 is configured to remap the acquired image data according to an acquisition sequence to acquire a first image-data series and a second image-data series. The first image-data series includes first image data arranged in the sequence of acquisition of the selector 205, and the second image-data series includes second image data arranged in the sequence of acquisition of the selector 205.

Figure 6:
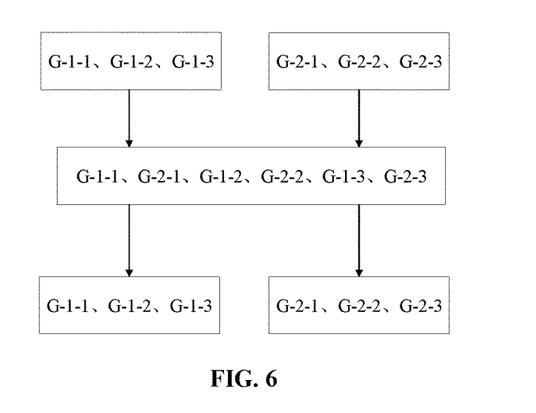
FIG. 6 is a schematic diagram of a process of processing image data according to some embodiments of the present disclosure.

For example, FIG. 6 is a schematic diagram of a process of processing image data according to some embodiments of the present disclosure.

As shown in FIG. 6, when the G light is turned on, the first image-data pixels collected by the first sensor are G-1-1, G-1-2, G-1-3; and the second image-data pixels collected by the second sensor are G-2-1, G-2-2, and G-2-3. Then the selector uses the pixel-by-pixel acquisition mode for each of the first and second channels, to acquire the image data G-1-1, G-2-1, G-1-2, G-2-2, G-1-3, G-2-3 alternately through the first channel and the second channel. The data remapping unit remaps the image data according to the acquisition sequence of the selector, so as to acquire the first image-data series and the second image-data series, where, the first image-data series includes the first image-data pixels G-1-1, G-1-2, and G-1-3 acquired according to the acquisition sequence of the selector; and the second image-data series includes the second image-data pixels G-2-1, G-2-2, and G-2-3 acquired according to the acquisition sequence of the selector.

In an exemplary implementation process, the data remapping unit remaps the acquired image data according to the acquisition sequence, which may include, but is not limited to, the following implementation manners.

For example, for the acquired image data, the data remapping unit extracts by interval form the image-data pixels in the image data according to the acquisition sequence, arranges the image-data pixels extracted by interval whose sequence numbers are odd numbers according to the acquisition sequence of the selector to acquire the first image-data series, and arranges the image-data pixels extracted by interval whose sequence numbers are even values according to the acquisition sequence of the selector to acquire the second image-data series. It can be understood that the example is only used to explain how to acquire the image data in the order of acquisition, and is not used to limit the solution.

The present disclosure does not limit the type of image data acquired by the selector. In some embodiments, the image data acquired through the first channel and the second channel by the selector using the pixel-by-pixel acquisition mode for each of the first and second channels may be an analog signal, or the image data acquired through the first channel and the second channel by the selector using the pixel-by-pixel acquisition mode for each of the first and second channels may be digital signal.

It can be understood that the position of the converters for performing analog-to-digital conversion in the scanning device varies as the type of image data acquired by the selector varies.

In an exemplary implementation process, referring to FIG. 2(a), the scanning device further includes a first converter 207 configured between the selector 205 and the data remapping unit 206; the first converter 207 is configured to perform analog-to-digital conversion on image data acquired by the selector 205; and the first converter 207 is further configured to send the image data acquired by the analog-to-digital conversion to the data remapping unit 206 according to the acquisition sequence of the selector 205.

It can be understood that, as shown in FIG. 2(a), when the first converter 207 is configured between the selector 205 and the data remapping unit 206, the format of the image data acquired by the selector 205 is analog signal, and the format of the image data sent by the selector 205 to the first convertor 207 is analog signal. After the analog-to-digital conversion by the first converter 207 the first converter 207 acquires image data in a digital signal format, and the first converter 207 sends the digital signal formatted image data to the data remapping unit 206.

In another exemplary implementation process, referring to FIG. 2(b), the scanning device further includes a second converter 208 configured between the first sensor 201 and the first channel 203, and a third converter 209 configured between the second sensor the 202 and the second channel 204.

As shown in FIG. 2(b), the second converter 208 is configured to perform the analog-to-digital conversion on the first image data collected by the first sensor 201, and the third converter 209 is configured to perform the analog-to-digital conversion on the second image data collected by the second sensor 202.

It can be understood that, as shown in FIG. 2(b), when the second converter 208 is configured between the first sensor 201 and the first channel 203, the format of the image data collected by the first sensor 201 is analog signal. After the second converter 208 performs the analog-to-digital conversion, the selector 205 acquires image data in a digital signal format through the first channel 203, and the selector 205 sends the image data in the digital signal format to the data remapping unit 206.

Similarly, as shown in FIG. 2(b), when the third converter 209 is configured between the second sensor 202 and the second channel 204, the format of the image data collected by the second sensor 202 is analog signal, and after the third he converter 209 performs the analog-to-digital conversion, the selector 205 acquires image data in a digital signal format through the second channel 204, and the selector 205 sends the image data in the digital signal format to the data remapping unit 206.

In some embodiments of the present disclosure, as shown in FIG. 2(a) or as shown in FIG. 2(b), only one-time analog-to-digital conversion needs to be performed on the first image data and the second image data, and therefore, the first converter 207 between the selector 205 and the data remapping unit 206 performs the analog-to-digital conversion on the image data acquired by the selector 205, so that there is no need to provide a second convertor 208 between the first sensor 201 and the first channel 203, and there is no need to provide a third convertor 209 between the second convertor 202 and the second channel 204. Or, the second converter 208 between the first sensor 201 and the first channel 203 performs the analog-to-digital conversion on the first image data acquired by the first sensor 201, the third convertor 209 between the second sensor 202 and the second channel 204 performs the analog-to-digital conversion on the second image data acquired by the second sensor 202, so that there is no need to provide the first convertor 207 between the selector 205 and the data remapping unit 206.

The present disclosure does not limit the location of the first image data collected by the first sensor and the location of the second image data collected by the second sensor.

In some embodiments, the first image data may be the front-side image data of the to-be-scanned document, and the second image data may be the back-side image data of the to-be-scanned document.

It can be understood that the scanning device provided by the present disclosure can be used for double-sided scanning. In this case, the first sensor and the second sensor can be located on the upper and lower sides of the to-be-scanned document. At this time, the first image data is the front-side image data of the to-be-scanned document, and the second image data is the back-side image data of the to-be-scanned document.

In some other embodiments, the first image data and the second image data may be frontal image data of the to-be-scanned document, or the first image data and the second image data may be the back-side image data of the to-be-scanned document.

It can be understood that the scanning device provided by the present disclosure can also be used for single-sided scanning. At this time, the first sensor and the second sensor are located on the same side of the to-be-scanned document, and at this time, according to the scanning side that is required according to the to-be-scanned document, the first image data and the second image data are the front-side image data of the to-be-scanned document, or the first image data and the second image data are the back-side image data of the to-be-scanned document.

In some embodiments of the present disclosure, application scenarios for the first image data and the second image data being the same side image data may include, but are not limited to, a combination of two A4 format sensors to implement A3 format scanning; or, in flatbed scanning, two sensors are scanned simultaneously from both ends of the to-be-scanned document; or, in the case of flatbed scanning, two sensors are simultaneously scanned from the middle of the to-be-scanned document to both ends; or in the case of flatbed scanning, one sensor is at the end and the other sensor is in the middle, in this way scanning simultaneously in the same direction.

In some embodiments, when the scanning device provided by the present disclosure is used for double-sided scanning, the first sensor and the second sensor may be in a positional relationship that is not exactly facing up and down, so as to avoid the first sensor and the second sensor the interference with each other while collecting image data and in the lighting process. The design of staggering the position of the two sensors can allow the timing of the first sensor collecting the first image data of the to-be-scanned document to be different from the timing of the second sensor collecting the second image data of the to-be-scanned document. When the double-sided scanning is performed, assuming the front-side data of the to-be-scanned document is first scanned, after the front-side data is scanned, the useless data in the image data collected by the sensor needs to be deleted, and before the revise-side data is scanned, the useless data in the image data collected by the sensor needs to be deleted.

In some embodiments of the present disclosure, as shown in FIG. 2(*a*) or as shown in FIG. 2(*b*), the scanning device may further include a data filtering unit 210. For example, when the data filtering unit may use the following but not limited to two methods to remove useless data.

In some embodiments, a first time point and a second time point are determined; and the first image data in the first image-data series collected by the first sensor after the first time point is deleted, and the second image data in the second image-data series collected by the second sensor before the second time point is deleted.

In some embodiments, the first time point may be the time point when the to-be-scanned document leaves the first sensor, and the second time point may be the time point when the to-be-scanned document reaches the second sensor.

It can be understood that one or more pixels of the first image data collected by the first sensor after the first time point is useless data, which can be performed with a removal processing can be performed; and one or more pixels of the second image data collected by the second sensor before the second time point is useless data, which can be performed with the removal processing.

Figure 7:
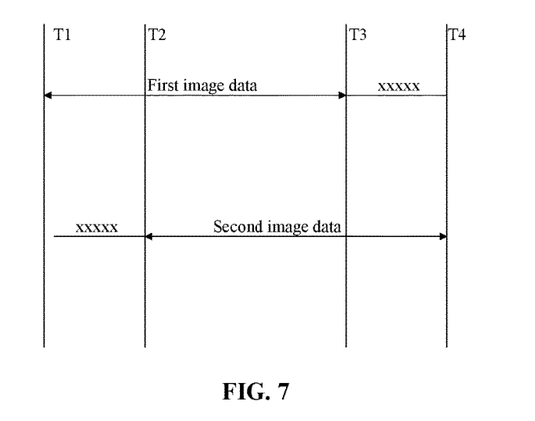
FIG. 7 is a schematic diagram of a process of removing useless data according to some embodiments of the present disclosure.

For example, it is assumed that the first sensor and the second sensor may be in a positional relationship that is not exactly facing up and down, and the first sensor first scans the front-side data of the document to be processed. Reference can be made to FIG. 7, which is a schematic diagram of a process of removing useless data according to some embodiments of the present disclosure.

As shown in FIG. 7, at time point T1, the first sensor and the second sensor simultaneously perform image acquisition, and in the scanning device, the first sensor first scans the front-side data of the to-be-scanned document, so that the first image data collected by the first sensor at the time point T1 is the front-side data of the to-be-scanned document. However, at this time, the to-be-scanned document has not reached the second sensor, thus, the second image data collected by the second sensor at the time point T1 is useless data. Till the time point T2, the to-be-scanned document reaches the second sensor, the second image data collected by the second sensor beginning from the time point T2 is the reverse-sided data of the to-be-scanned document.

At the time point T3, the to-be-scanned document leaves the first sensor, and the first image data collected by the first sensor after the time point T3 is useless data. At the time point T4, the to-be-scanned document leaves the second sensor, the first sensor and the second sensor stop the acquisition of the image data. As shown in FIG. 7, xxxxx represents useless data, and the useless data needs to be removed.

As shown in FIG. 7, only the first time point T3 and the second time point T2 need to be determined. Therefore, one or more pixels of the first image data in the first image-data series collected by the first sensor after the time point T3 is deleted. One or more pixels of the second image data in the second image-data series collected by the second sensor before the T2 time point is deleted, so that the useless data collected can be deleted.

In some other embodiments, one or more pixels of the first image data at the end of the first image-data series is deleted according to the first specified value, and one or more pixels of the second image data at the start of the second image-data series is deleted according to the second specified value.

In some embodiments of the present disclosure, the first specified value and the second specified value may be preset according to actual needs, and the present disclosure does not limit this.

It can be understood that, in the present disclosure, after the data acquired by the selector is remapped by the data remapping unit to acquire the first image-data series and the second image-data series, the acquired first image-data series and the second image-data series are stored separately.

In some embodiments of the present disclosure, the scanning device may further include at least one memory.

In an exemplary implementation process, the first image-data series and the second image-data series may be separately stored by two memories, that is, the first image-data series are stored by a first memory, and the second image-data series are stored by a second memory.

Figure 8:
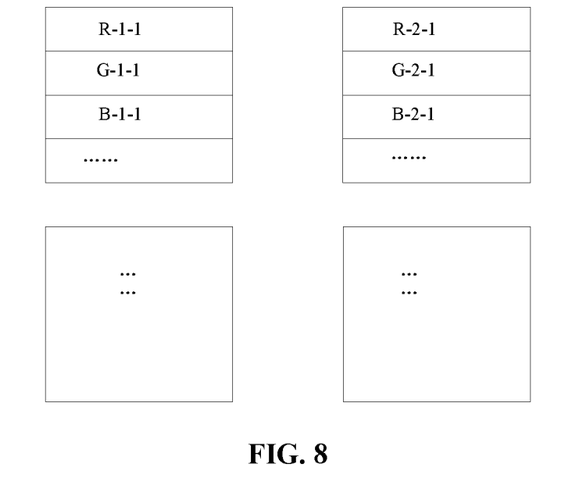
FIG. 8 is a schematic diagram of storing a first image-data series and a second image-data series according to some embodiments of the present disclosure.

For example, FIG. 8 is a schematic diagram of storing a first image-data series and a second image-data series according to some embodiments of the present disclosure. As shown in FIG. 8, the first image-data series acquired by the data remapping unit 206 are: R-1-1, G-1-1, and B-1-1; the acquired second image-data series are: R-2-1, G-2-1, and B-2-1. The first image-data series may be stored by the first memory on the left side in FIG. 8, and the second image-data series may be stored by the second memory on the right side in FIG. 8 to acquire the separately stored first image-data series and the first Two image-data series.

It can be understood that storing the first image-data series and the second image-data series separately by two memories is only an implementation manner and is only used to indicate how to separately store the acquired first image-data series and second image-data series and is not intended to limit the present disclosure. In some embodiments of the present disclosure, the first image-data series and the second image-data series may be separately stored in different locations through a memory to acquire the separately stored first image-data series and second image-data series. The implementation of the present disclosure for separately storing the first image-data series and the second image-data series is not limited by the present disclosure.

In some embodiments, the acquired first image-data series and the second image-data series may further perform image processing, such as image edge sharpening processing, background removal processing, etc., and the first image-data series and the second image-data series after processed can be stored, which is not limited by the present disclosure.

In the existing technology, there is also a scanning device that can be used for double-sided scanning. The scanning device in the existing technology includes two sensors and an image acquiring unit, where the two sensors respectively collect the front-side image data and the back-side image data of the to-be-scanned document, so as to acquire the image data collected by the two sensors through an image acquisition unit using an alternate line-by-line manner. Therefore, the scanning device must acquire the data collected by the other sensor after acquiring one line of data of one sensor. Therefore, when the scanning device is used for double-sided scanning of the to-be-scanned document, the scanning speed is half of the scanning speed of a single-sided scanning, the scanning time is long, and the scanning efficiency is low.

In contrast, as shown in FIG. 2(*a*) or as shown in FIG. 2(*b*), the selector in the present disclosure acquires image data alternately from the first channel 203 and the second channel 204 by the pixel-by-pixel acquisition mode for each of the first and second channels. In the present disclosure, the selector 205 may acquire a second image-data pixel output by the second sensor 202 by using a time interval after the first sensor 201 outputs a first image-data pixel, acquire a first image-data pixel output by the first sensor 201 by using the time interval after the first sensor 202 outputs a second image-data pixel. Therefore, the length of the data that the selector 205 can collect in one acquisition cycle is smaller than the data length output by the sensors, so that the selector 205 can uninterruptedly and continuously acquire the image data collected by the first sensor 201 and the image data collected by the second sensor 202 alternately. As such, for the to-be-scanned document, the scanning speed of the double-sided scanning is the same as the scanning speed of the single-sided scanning, which greatly saves the scanning time and improves the scanning efficiency.

One technical solution in the present disclosure has the following beneficial effects.

The scanning device provided by the present disclosure acquires images by scanning the document simultaneously by two sensors, and processes the images collected by the two sensors through a selector, thereby saving hardware costs and solving the problems of high hardware costs of the scanning device to realize double-sided scanning device. Moreover, the working mode that the selector uses a pixel-by-pixel acquisition mode for each of the first and second channels to acquire the image data alternately from the first channel and the second channel, so that the scanning speed of the scanning device when performing double-sided scanning is approximately equal to that of single-sided scanning, improving scanning efficiency.

Another aspect of the present disclosure also provides an image-forming apparatus.

Figure 9A:
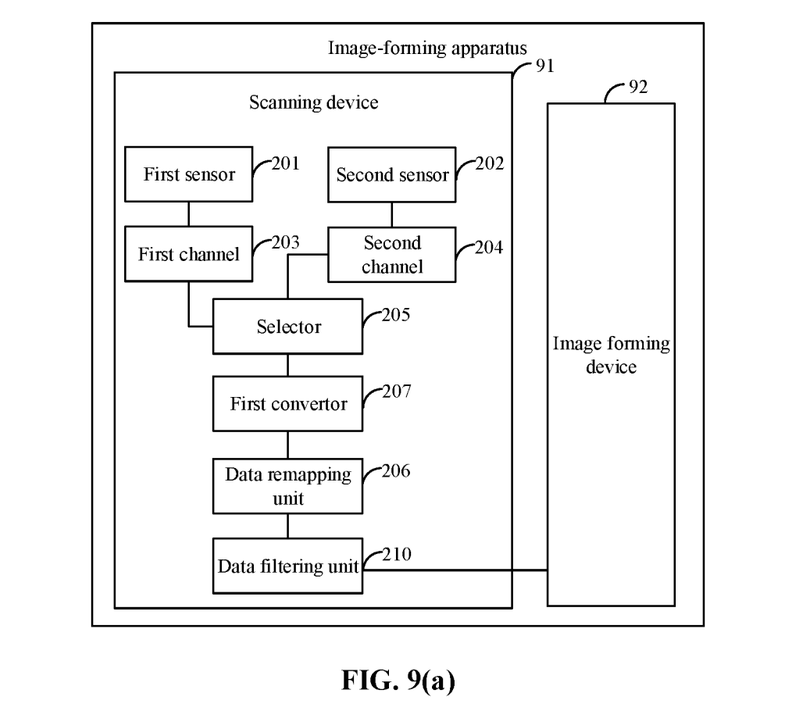
FIG. 9(a) is a schematic structural diagram of an exemplary image-forming apparatus according to some embodiments of the present disclosure.

FIG. 9(*a*) is a schematic structural diagram of an exemplary image-forming apparatus according to some embodiments of the present disclosure. As shown in FIG. 9(*a*), the image-forming apparatus includes the scanning device 91 and the image-forming device 92 according to the foregoing embodiments.

For example, as shown in FIG. 9(*a*), the image-forming device 92 is configured to form an image on the image-forming medium based on the image data processed by the scanning device 91.

In some embodiments of the present disclosure, the material of the image-forming medium can be determined according to actual needs, which is not specifically limited in the present disclosure.

The present disclosure does not limit the image-forming method of the image-forming device 92 shown in FIG. 9(*a*). For example, the image-forming device 92 may employ any one of image-forming methods such as laser image-forming and inkjet image-forming.

Figure 9B:
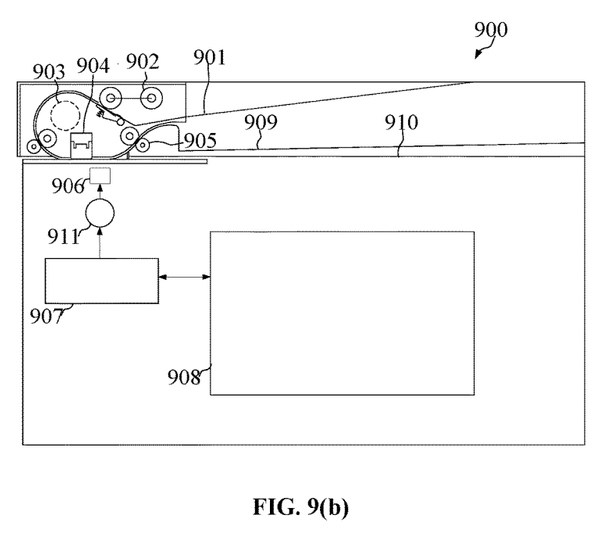
FIG. 9(b) is a schematic structural diagram of another exemplary image-forming apparatus according to some other embodiments of the present disclosure.

FIG. 9(*b*) is a schematic structural diagram of another exemplary image-forming apparatus according to some other embodiments of the present disclosure.

As shown in FIG. 9(*b*), the image-forming apparatus 900 includes the above-described scanning device and image-forming device 908, and a control device 907 which simultaneously serves as a controller of the scanning device and the image-forming device 908.

In some embodiments, as shown in FIG. 9(*b*), the image-forming device 908 is configured to perform image-forming according to image data acquired by the scanning device.

In the present disclosure, as shown in FIG. 9(*b*), the scanning device includes an automatic document feeder (ADF), and the ADF includes a paper-pickup roller assembly 909 and a paper-discharge roller assembly 905, a first motor 903 for providing a driving force to the paper-pickup roller assembly 909 and the paper-discharge roller assembly 905, a first sensor 904 for collecting the first image data of the to-be-scanned document, the first sensor located in the ADF frame, and a second sensor 906, the second sensor 906 located below a flatbed scanning platform 910.

In the present disclosure, as shown in FIG. 9(*b*), the models of the first sensor 904 and the second sensor 906 are not limited by the present disclosure. For example, the first sensor 904 and the second sensor 906 may be configured as a contact image sensor (CIS); or the first sensor 904 and the second sensor 906 may also be partially or completely configured as a charge coupled device (CCD).

The process of performing double-sided scanning by the scanning device shown in FIG. 9(*b*) is after the to-be-scanned document passes through the paper feeding port 901, the paper-pickup roller assembly 909 transports the to-be-scanned document along the predetermined paper path in the A/DF to pass through the first sensor 904 and the second sensor 906. The first sensor 904 and the second sensor 906 respectively collect the first image data and the second image data of the to-be-scanned document. After the first sensor 904 collects the first image data and the second sensor 906 collects the second image data, after the completing scanning, the to-be-scanned document is discharged to the paper-discharge tray through the paper-discharge roller assembly 905.

In some embodiments, as shown in FIG. 9(*b*), the scanning speed when the scanning device performs double-sided scanning, that is, the number of pages that are scanned per minute, can be set based on predetermined parameters, according to the image data collected by the first sensor 904 and the second sensor 906, the data transmitting speed, the rotating speed of the first motor 903, which is not limited in the present disclosure.

The process of performing single-sided scanning by the scanning device shown in FIG. 9(*b*) is placing the image to be scanned in the to-be-scanned document facing down on the flatbed scanning platform 910 and moving the second sensor 906 through the second motor 911. At this time, the second sensor 906 can acquire the side of the document with data and complete the single-sided scanning.

Figure 10:
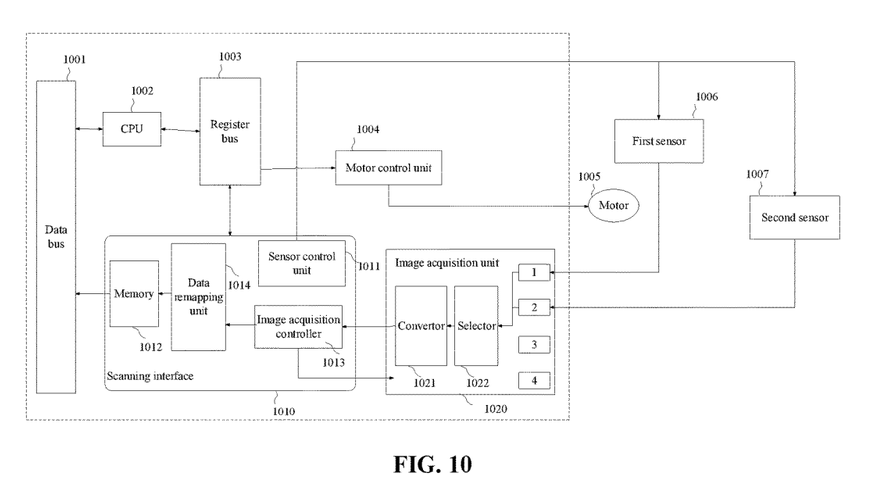
FIG. 10 is a schematic structural diagram of another scanning device according to some other embodiments of the present disclosure.

FIG. 10 is a schematic structural diagram of another scanning device according to some other embodiments of the present disclosure.

As shown in FIG. 10, the scanning device consistent with some embodiments of the present disclosure is provided with a first sensor 1006 (first sensor 904 in FIG. 9(*b*)), a second sensor 1007 (second sensor 906 in FIG. 9(*b*)), an image acquisition unit 1020, and a scanning interface 1010. The image acquisition unit 1020 is also provided with four data channels, a first channel, a second channel, a third channel, and a fourth channel. The image acquisition unit 1020 is also configured with a selector 1022 for selecting data from different channels and a convertor 2021. An image acquisition controller 1013 can perform data processing on the data sent by the selector 1022 and provide control signal when the image acquisition unit 1020 collects data from different channels. A sensor control unit 1011 is configured to send control signal such as clock control signal, lighting control signal, etc., to the first sensor 1006 and the second sensor 1007. In addition, the scanning device is also configured with a register bus 1003 connected to the scanning interface 1010. The CPU 1002 of the scanning device is connected to the scanning interface 1010 through the register bus 1003. The CPU 1002 can share data with external memory and the USB interface, etc. though the data bus 1001. The CPU 1002 can send control instruction to the motor controller 1004 though the register bus 1003. The motor controller 1004 can send clock signal to the motor 1005 according to the received control instruction.

In an exemplary implementation process, the scanning interface 1010, the image acquisition unit 1020, the register bus 1003, and the CPU 1002 and the data bus 1001 in the dashed-line frame in FIG. 10 can be integrated into one controller, so there is no need to add additional image acquisition unit hardware circuit, reducing the cost.

One technical solution in the present disclosure has the following beneficial effects.

the image-forming apparatus provided by the present disclosure acquires images by scanning the document simultaneously by two sensors, and processes the images collected by the two sensors through a selector, thereby saving hardware costs and solving the problems of high hardware costs of the scanning device to realize double-sided scanning device. Moreover, the working mode that the selector uses a pixel-by-pixel acquisition mode for each of the first and second channels to acquire the image data alternately from the first channel and the second channel, so that the scanning speed of the scanning device when performing double-sided scanning is approximately equal to that of single-sided scanning, improving scanning efficiency.

Based on the scanning device described above, another aspect of the present disclosure further provides a scanning method.

Figure 11:
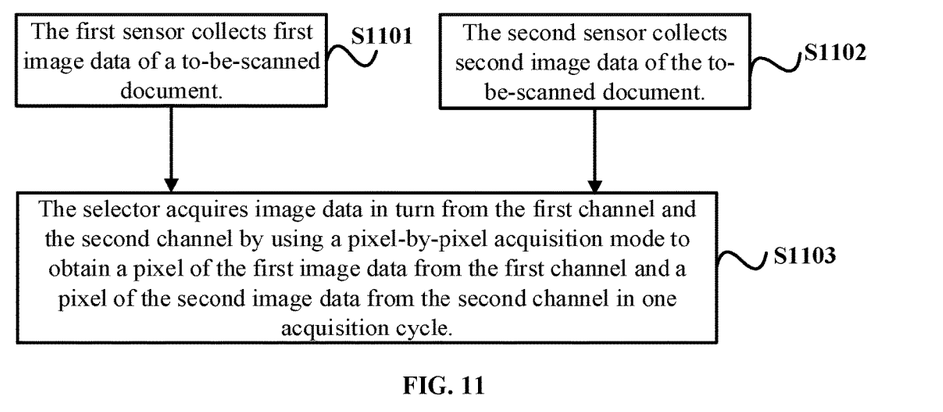
FIG. 11 is a schematic flow chart of an exemplary scanning method according to some embodiments of the present disclosure.

FIG. 11 is a schematic flow chart of an exemplary scanning method according to some embodiments of the present disclosure. As shown in FIG. 11, the method includes the following steps.

S1101, the first sensor collects first image data of a to-be-scanned document.

S1102, the second sensor collects second image data of the to-be-scanned document.

In some embodiments of the present disclosure, the steps of S1101 and S1102 can be performed simultaneously, and there is no sequence, and the first sensor and the second sensor can simultaneously perform acquisition of image data respectively.

S1103, the selector acquires image data alternately from the first channel and the second channel by using a pixel-by-pixel acquisition mode for each of the first and second channels to acquire a pixel of the first image data from the first channel and a pixel of the second image data from the second channel in one acquisition cycle.

In some embodiments, the method may further include the data remapping unit remapping the acquired image data according to an acquisition sequence of the selector, to acquire a first image-data series and a second-image-data series, where the first image-data series includes the first image data arranged in the acquisition sequence of the selector, and the second image-data series includes the second image data arranged in the acquisition sequence of the selector.

In an exemplary implementation process, before the data remapping unit remaps the acquired image data according to the acquisition sequence of the selector, the method further includes the first converter performing an analog-to-digital conversion on the image data acquired from the first sensor and the second sensor and sending image data acquired after the analog-to-digital conversion to the data remapping unit according to the acquisition sequence of the selector.

In another exemplary implementation process, the selector uses a pixel-by-pixel acquisition mode for each of the first and second channels to acquire image data alternately from the first channel and the second channel, the method further includes the second converter performing the analog-to-digital conversion on the first image data collected by the first sensor; and the third converter performing the analog-to-digital conversion on the second image data collected by the second sensor.

In some embodiments of the present disclosure, after the data remapping unit remaps the acquired image data according to the acquisition sequence of the selector to acquire the first image-data series and the second image-data series, the method further includes the data filtering unit determining the first time point and the second time point; and the data filtering unit deleting one or more pixels of the first image data in the first image-data series collected by the first sensor after the first time point, and deleting one or more pixels of the second image data in the second image-data series collected by the second sensor before the second time point.

In some other embodiments, the method may further include the data filtering unit deleting the one or more pixels of the first image data of at an end in the first image-data series according to a first specified value and deleting the one or more pixels of the second image data of at the start of the second image-data series according to a second specified value.

In an exemplary implementation process, the selection frequency when the selector selects the channel is greater than or equal to twice the output frequency of the first sensor; and/or, the selection frequency when the selector selects the channel is greater than or equal to twice the output frequency of the second sensor.

In another exemplary implementation process, the first image data is front-side image data of a to-be-scanned document, and the second image data is back-side image data of the to-be-scanned document; or the first image data and the second image data are both the front-side image data of the to-be-scanned document; or the first image data and the second image data are both back-side image data of the to-be-scanned document.

Since the scanning method consistent with some embodiments of the present disclosure is used for the scanning device shown in FIG. 2(*a*) or FIG. 2(*b*), the part not described in detail for the scanning method can be referred to FIG. 2(*a*) or FIG. 2 (*b*) related instructions.

One technical solution in the present disclosure has the following beneficial effects.

The scanning method provided by the present disclosure, acquires images by scanning the document simultaneously by two sensors, and processes the images collected by the two sensors through a selector, thereby saving hardware costs and solving the problems of high hardware costs of the scanning device to realize double-sided scanning device. Moreover, the working mode that the selector uses a pixel-by-pixel acquisition mode for each of the first and second channels to acquire the image data alternately from the first channel and the second channel, so that the scanning speed of the scanning device when performing double-sided scanning is approximately equal to that of single-sided scanning, improving scanning efficiency.

A person skilled in the art can clearly understand that for the convenience and brevity of the description, the working process of the system, the device and the unit described above can refer to the corresponding process in the foregoing method embodiment, and details are not described herein again.

In the several embodiments provided by the present disclosure, it should be understood that the disclosed system, apparatus, and method may be implemented in other manners. For example, the device embodiments described above are merely illustrative. For example, the division of the unit is only a logical function division, and the actual implementation may have another division manner. For example, multiple units or components may be combined or it can be integrated into another system, or some features can be ignored or not executed. In addition, the coupling or direct coupling or communication connection shown or discussed herein may be an indirect coupling or communication connection through some interface, device or unit, and may be electrical, mechanical or other forms.

The units described as separate components may or may not be physically separated, and the components displayed as units may or may not be physical units, that is, may be located in one place, or may be distributed to multiple network units. Some or all of the units may be selected according to actual needs to achieve the purpose of the solution of the embodiment.

In addition, each functional unit in each embodiment of the present disclosure may be integrated into one processing unit, or each unit may exist physically separately, or two or more units may be integrated into one unit. The above integrated unit can be implemented in the form of hardware or in the form of hardware and software functional units.

The above-described integrated unit implemented in the form of a software functional unit can be stored in a computer readable storage medium. The software functional unit described above is stored in a storage medium and includes instructions for causing a computer device (which may be a personal computer, a server, or a network device, etc.) or a processor to perform partial steps of the methods of the various embodiments of the present disclosure. The foregoing storage medium may be various medium can store program codes including a U disk, a mobile hard disk, a read-only memory (ROM), a random-access memory (RAM), a magnetic disk, or an optical disk, etc., which can store program codes.

The above description is only for the exemplary embodiments of the present disclosure and is not intended to limit the present disclosure. Any modifications, equivalent substitutions, improvements, etc. made within the spirit and principles of the present disclosure are included in the scope of protection of the present disclosure.

What is claimed is:

1. A scanning device, comprising:
a memory storing instructions; and
a processor coupled to the memory and, when executing the instructions, configured to:
collect, by a first sensor, first image data of a to-be-scanned document;
have a first channel corresponding to the first sensor;
configured to collect, by a second sensor, second image data of the to-be-scanned document;
have a second channel corresponding to the second sensor; and
acquire image data alternately from the first channel and the second channel to acquire a pixel of the first image data from the first channel and a pixel of the second image data from the second channel by using a pixel-by-pixel acquisition mode for each of the first and second channels in one acquisition cycle,
wherein:
a selection frequency when selecting a channel is greater than or equal to twice of an output frequency of the first sensor; or the selection frequency when selecting the channel is greater than or equal to twice of an output frequency of the second sensor;
the processor is further configured to:
remap the image data acquired from the first sensor and the second sensor according to an acquisition sequence to acquire a first image-data series and a second image-data series,
wherein:
the first image-data series includes the first image data arranged according to the acquisition sequence; and the second image-data series includes the second image data arranged according to the acquisition sequence; and
determine a first time point and a second time point,
wherein the first time point is when the to-be-scanned document leaves the first sensor and the second time point is when the to-be-scanned document reaches the first sensor;
delete one or more pixels of the first image data in the first image-data series collected by the first sensor after the first time point; and
delete one or more pixels of the second image data in the second image-data series collected by the second sensor before the second time point.

2. The scanning device according to claim 1, the processor is further configured to:
perform an analog-to-digital conversion on the image data acquired; and send the image data acquired by the analog-to-digital conversion to the data remapping unit according to the acquisition sequence.

3. The scanning device according to claim 1, the processor is further configured to:
perform an analog-to-digital conversion on the first image data collected by the first sensor; and perform an analog-to-digital conversion on the second image data collected by the second sensor.

4. The scanning device according to claim 1, the processor is further configured to:
delete one or more pixels of the first image data at an end of the first image-data series according to a first specified value; and
delete one or more pixels of the second image data at a start of the second image-data series according to a second specified value.

5. The scanning device according to claim 1, wherein: the first image data is front-side image data of the to-be-scanned document, and the second image data is back-side image data of the to-be-scanned document; or the first image data and the second image data are the front-side image data of the to-be-scanned document; or the first image data and the second image data are the back-side image data of the to-be-scanned document.

6. An image-forming apparatus, comprising: the scanning device according to claim 1; and an image-forming device, configured to form an image on an image-forming medium according to the image data processed by the scanning device.

7. The scanning device according to claim 1, wherein: each pixel of the first image data of the to-be-scanned document has colors (Red, Green, and Blue) indicated by a lighting control signal sequentially, and each pixel of the second image data of the to-be-scanned document has colors (Red, Green, and Blue) indicated by the lighting control signal sequentially.

8. The scanning device according to claim 7, wherein: acquiring the image data through the first channel and the second channel is one acquisition cycle after the lighting control signal is sent out.

9. A scanning method, comprising:
collecting, by a first sensor, first image data of a to-be-scanned document;
collecting, by a second sensor, second image data of the to-be-scanned document; and using, a pixel-by-pixel acquisition mode for each of first and second channels to acquire image data alternately from a first channel and a second channel, to acquire a pixel of the first image data from the first channel and a pixel of the second image data from the second channel in one acquisition cycle,
wherein: a selection frequency when selecting a channel is greater than or equal to twice of an output frequency of the first sensor; or the selection frequency when selecting the channel is greater than or equal to twice of an output frequency of the second sensor; and
further comprising:
remapping, the acquired image data according to an acquisition, to acquire a first image-data series and a second-image-data series,
wherein: the first image-data series includes the first image data arranged in the acquisition sequence; and the second image-data series includes the second image data arranged in the acquisition sequence; and
wherein after remapping the acquired image data according to the acquisition sequence to acquire the first image-data series and the second image-data series, the method further comprises:
determining a first time point and a second time point;
deleting one or more pixels of the first image data in the first image-data series collected by the first sensor after the first time point; and
deleting one or more pixels of the second image data in the second image-data series collected by the second sensor before the second time point.

10. The method according to claim 9, wherein before acquiring image data according to the acquisition sequence, the method further comprises: performing, an analog-to-digital conversion on the image data acquired from the first sensor and the second sensor; and sending image data acquired by the analog-to-digital conversion to remap according to the acquisition sequence.

11. The method according to claim 9, wherein before the image data is acquired alternately from the first channel and the second channel by using the pixel-by-pixel acquisition mode for each of the first and second channels, the method further comprises: performing an analog-to-digital conversion on the first image data collected by the first sensor; and performing the analog-to-digital conversion on the second image data collected by the second sensor.

12. The method according to claim 9, wherein after remapping the acquired image data according to the acquisition sequence to acquire the first image-data series and the second image-data series, the method further comprises: deleting one or more pixels of the first image data at an end in the first image-data series according to a first specified value; and deleting one or more pixels of the second image data at a start of the first image-data series according to the second specified value.

13. A method according to claim 9, wherein the first image data is front-side image data of the to-be-scanned document, and the second image data is back-side image data of the to-be-scanned document; or the first image data and the second image data are the front-side image data of the to-be-scanned document; or the first image data and the second image data are the back-side image data of the to-be-scanned document.

\* \* \* \* \*